(12) United States Patent
Noh et al.

(10) Patent No.: US 9,973,250 B2
(45) Date of Patent: May 15, 2018

(54) METHOD FOR TRANSMITTING SOUNDING REFERENCE SIGNAL IN MULTIPLE ANTENNA WIRELESS COMMUNICATION SYSTEM AND APPARATUS THEREFOR

(71) Applicant: LG ELECTRONICS INC., Seoul (KR)

(72) Inventors: Minseok Noh, Anyang-si (KR); Hyunsoo Ko, Anyang-si (KR); Jaehoon Chung, Anyang-si (KR); Moon-il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/226,066

(22) Filed: Aug. 2, 2016

(65) Prior Publication Data
US 2016/0344462 A1    Nov. 24, 2016

Related U.S. Application Data

(63) Continuation of application No. 14/842,507, filed on Sep. 1, 2015, now Pat. No. 9,425,877, which is a (Continued)

(30) Foreign Application Priority Data

Mar. 30, 2011  (KR) ........................ 10-2011-0028851

(51) Int. Cl.
*H04W 28/06* (2009.01)
*H04B 7/06* (2006.01)
(Continued)

(52) U.S. Cl.
CPC ......... *H04B 7/0606* (2013.01); *H04B 7/0413* (2013.01); *H04L 5/0023* (2013.01);
(Continued)

(58) Field of Classification Search
CPC .............. H04L 5/0048; H04L 27/2605; H04L 27/2607; H04L 5/0023; H04L 5/0091;
(Continued)

(56) References Cited

U.S. PATENT DOCUMENTS 7,248,559 B2   7/2007  Ma et al.
8,085,873 B2  12/2011  Bjerke et al.
(Continued)

FOREIGN PATENT DOCUMENTS

AU    2011355861 B2    7/2012
CN     101689926 A     3/2010
(Continued)

*Primary Examiner* — Ted Wang
(74) *Attorney, Agent, or Firm* — Birch, Stewart, Kolasch & Birch, LLP

(57) ABSTRACT

A method and a user equipment (UE) for transmitting sounding reference signals via multiple antenna ports in a wireless communication system are discussed. The method according to one embodiment includes receiving a parameter via a higher layer; applying a code division multiplexing (CDM) scheme to the sounding reference signals using the parameter; applying a frequency division multiplexing (FDM) scheme to the sounding reference signals when the parameter is a first value; and transmitting the sounding reference signals via the multiple antenna ports.

8 Claims, 8 Drawing Sheets

(a) control-plane protocol stack (b) user-plane protocol stack

Related U.S. Application Data continuation of application No. 14/689,651, filed on Apr. 17, 2015, now Pat. No. 9,143,298, which is a continuation of application No. 14/087,765, filed on Nov. 22, 2013, now Pat. No. 9,025,696, which is a continuation of application No. 13/920,935, filed on Jun. 18, 2013, now Pat. No. 8,619,941, which is a continuation of application No. 13/841,682, filed on Mar. 15, 2013, now Pat. No. 8,619,940, which is a continuation of application No. 13/158,998, filed on Jun. 13, 2011, now Pat. No. 8,428,166.

(60) Provisional application No. 61/434,802, filed on Jan. 20, 2011, provisional application No. 61/434,274, filed on Jan. 19, 2011.

(51) Int. Cl.
| | |
|---|---|
| *H04L 5/00* | (2006.01) |
| *H04W 28/18* | (2009.01) |
| *H04W 48/08* | (2009.01) |
| *H04B 7/0413* | (2017.01) |
| *H04L 27/26* | (2006.01) |
| *H04W 72/04* | (2009.01) |
| *H04W 48/16* | (2009.01) |
| *H04W 88/02* | (2009.01) |

(52) U.S. Cl.
CPC .......... *H04L 5/0048* (2013.01); *H04L 5/0053* (2013.01); *H04L 5/0091* (2013.01); *H04L 27/2605* (2013.01); *H04L 27/2607* (2013.01); *H04W 28/18* (2013.01); *H04W 48/08* (2013.01); *H04W 72/0406* (2013.01); *H04W 28/06* (2013.01); *H04W 48/16* (2013.01); *H04W 88/02* (2013.01)

(58) Field of Classification Search
CPC ... H04L 5/0053; H04B 7/0413; H04B 7/0606; H04W 28/06; H04W 48/08; H04W 48/16
See application file for complete search history.

(56) References Cited

U.S. PATENT DOCUMENTS

| | | | |
|---|---|---|---|
| 8,259,871 B2 | 9/2012 | Hosokawa et al. | |
| 8,619,941 B2 | 12/2013 | Noh et al. | |
| 2006/0095732 A1 | 5/2006 | Tran et al. | |
| 2008/0298497 A1 | 12/2008 | Cho et al. | |
| 2009/0046570 A1* | 2/2009 | Sarkar | H04B 7/0417 370/203 |
| 2009/0316756 A1 | 12/2009 | Ro et al. | |
| 2010/0091916 A1 | 4/2010 | Henriksson et al. | |
| 2010/0215114 A1 | 8/2010 | Kim et al. | |
| 2011/0105167 A1* | 5/2011 | Pan | H04B 7/0671 455/507 |
| 2011/0150736 A1 | 6/2011 | Hagiwara et al. | |
| 2011/0194630 A1* | 8/2011 | Yang | H04L 1/0025 375/260 |
| 2011/0200143 A1 | 8/2011 | Koo et al. | |
| 2011/0249648 A1 | 10/2011 | Jen | |
| 2012/0002568 A1* | 1/2012 | Tiirola | H04L 1/0026 370/252 |

FOREIGN PATENT DOCUMENTS

| | | | |
|---|---|---|---|
| EP | 2293461 A1 | 3/2011 | |
| EP | 2 625 796 A4 | 4/2014 | |
| JP | 2010-525722 A | 7/2010 | |
| WO | WO 2009/152696 A1 | 12/2009 | |
| WO | WO 2009152696 A1 * | 12/2009 | .......... H04B 7/0671 |
| WO | WO 2010/044555 A2 | 4/2010 | |
| WO | WO 2010/082756 A2 | 7/2010 | |
| WO | WO 2012/099301 A1 | 7/2012 | |

\* cited by examiner (a) control-plane protocol stack (b) user-plane protocol stack

METHOD FOR TRANSMITTING SOUNDING REFERENCE SIGNAL IN MULTIPLE ANTENNA WIRELESS COMMUNICATION SYSTEM AND APPARATUS THEREFOR

CROSS-REFERENCE TO RELATED APPLICATIONS

This Application is a Continuation of co-pending U.S. patent application Ser. No. 14/842,507 filed on Sep. 1, 2015, which is a Continuation of U.S. patent application Ser. No. 14/689,651 filed on Apr. 17, 2015 (now U.S. Pat. No. 9,143,298 issued on Sep. 22, 2015), which is a Continuation of U.S. patent application Ser. No. 14/087,765 filed on Nov. 22, 2013 (now U.S. Pat. No. 9,025,696 issued on May 5, 2015), which is a Continuation of U.S. patent application Ser. No. 13/920,935 filed on Jun. 18, 2013 (now U.S. Pat. No. 8,619,941 issued on Dec. 31, 2013), which is a Continuation of U.S. patent application Ser. No. 13/841,682 filed on Mar. 15, 2013 (now U.S. Pat. No. 8,619,940 issued on Dec. 31, 2013), which is a Continuation of U.S. patent application Ser. No. 13/158,998 filed on Jun. 13, 2011 (now U.S. Pat. No. 8,428,166 issued on Apr. 23, 2013), which claims the benefit under 35 U.S.C. § 119(e) to U.S. Provisional Application Nos. 61/434,802 filed on Jan. 20, 2011 and 61/434,274 filed on Jan. 19, 2011, and under 35 U.S.C. § 119(a) to Korean Patent Application No. 10-2011-0028851 filed on Mar. 30, 2011, all of which are hereby expressly incorporated by reference into the present application.

BACKGROUND OF THE INVENTION

Field of the Invention

The present invention relates to a wireless communication system, and more particularly, to a method for transmitting a sounding reference signal from a user equipment to a base station in a wireless communication system and an apparatus therefor.

Discussion of the Related Art

A $3^{rd}$ generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to indicate time and frequency domains to which data will be transmitted and information related to encoding, data size, hybrid automatic repeat and request (HARQ). Also, the base station transmits uplink (UL) scheduling information of uplink data to the corresponding user equipment to indicate time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, the standardization project for the subsequent technology of the LTE is in progress under the 3GPP. In this specification, this technology will be referred to as "LTE-Advanced" or "LTE-A". The LTE system is different from the LTE-A system in that it supports uplink transmission by using a MIMO antenna scheme.

SUMMARY OF THE INVENTION

Accordingly, an object of the present invention is to provide a method for transmitting a sounding reference signal in a MIMO antenna a wireless communication system and an apparatus therefor, which substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a sounding reference signal from a user equipment in a MIMO antenna wireless communication system comprises receiving sounding reference signal setup information from a base station, the sounding reference signal setup information including an initial cyclic shift value $n_{SRS}^{cs}$ and an initial transmissionComb parameter value $\overline{k}_{TC}$; setting an interval between cyclic shift values corresponding to each antenna port based on the initial cyclic shift value, to reach a maximum interval; setting a transmissionComb parameter value corresponding to a specific one of the antenna ports to a value different from the initial transmissionComb parameter value if the initial cyclic shift value is a previously set value and the number of antenna ports is 4; and transmitting the sounding reference signal to the base station through each antenna port by using the set cyclic shift value and transmissionComb parameter value.

In another aspect of the present invention, a user equipment of a MIMO antenna wireless communication system comprises a receiving module receiving sounding reference signal setup information from a base station, the sounding reference signal setup information including an initial cyclic shift value $n_{SRS}^{cs}$ and an initial transmissionComb parameter value $\bar{k}_{TC}$; a processor setting an interval between cyclic shift values corresponding to each antenna port based on the initial cyclic shift value, to reach a maximum interval, and setting a transmissionComb parameter value corresponding to a specific one of the antenna ports to a value different from the initial transmissionComb parameter value if the initial cyclic shift value is a previously set value and the number of antenna ports is 4; and a transmitting module transmitting the sounding reference signal to the base station through each antenna port by using the set cyclic shift value and transmissionComb parameter value. In this case, the initial transmissionComb parameter value $\bar{k}_{TC}$ is 0 or 1, and the value different from the transmissionComb parameter value is defined as $1-\bar{k}_{TC}$.

Preferably, the initial cyclic shift value $n_{SRS}^{cs}$ is a random integer between 0 and 7.

More preferably, the previously set cyclic shift value $n_{SRS}^{cs}$ is a random integer between 4 and 7, and the specific antenna port has an index $\tilde{p}$ of 1 or 3.

A transmissionComb parameter value $k_{TC}^{(p)}$ allocated to the antenna port index $\tilde{p}$ is determined in accordance with the following Equation:

$$k_{TC}^{(p)} = \begin{cases} 1 - \bar{k}_{TC} & \text{if } n_{SRS}^{cs} \in \{4, 5, 6, 7\} \text{ and } \tilde{p} \in \{1, 3\} \\ \bar{k}_{TC} & \text{otherwise} \end{cases}.$$

According to the embodiments of the present invention, the user equipment can effectively transmit a sounding reference signal to the base station in a wireless communication system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as that of the system block of the legacy system. On the other hand, there is no limitation in sizes of the other frequency blocks. However, for system simplification, the sizes of the other frequency blocks may be determined based on the size of the system block of the legacy system. For example, the 3GPP LTE system and the 3GPP LTE-A system are evolved from the legacy system.

Based on the aforementioned definition, the 3GPP LTE system will herein be referred to as an LTE system or a legacy system. Also, a user equipment that supports the LTE system will be referred to as an LTE user equipment or a legacy user equipment. The 3GPP LTE-A system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary and the embodiment of the present invention can easily be applied to H-FDD mode or TDD mode.

Figure 1:
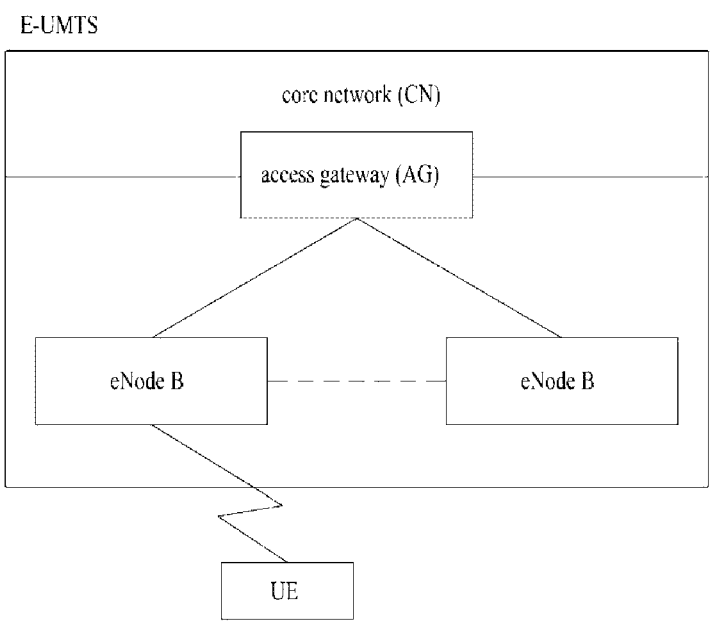
FIG. 1 is a diagram illustrating a network structure of an Evolved Universal Mobile Telecommunications System (E-UMTS) which is an example of a mobile communication system.
Figure 2:
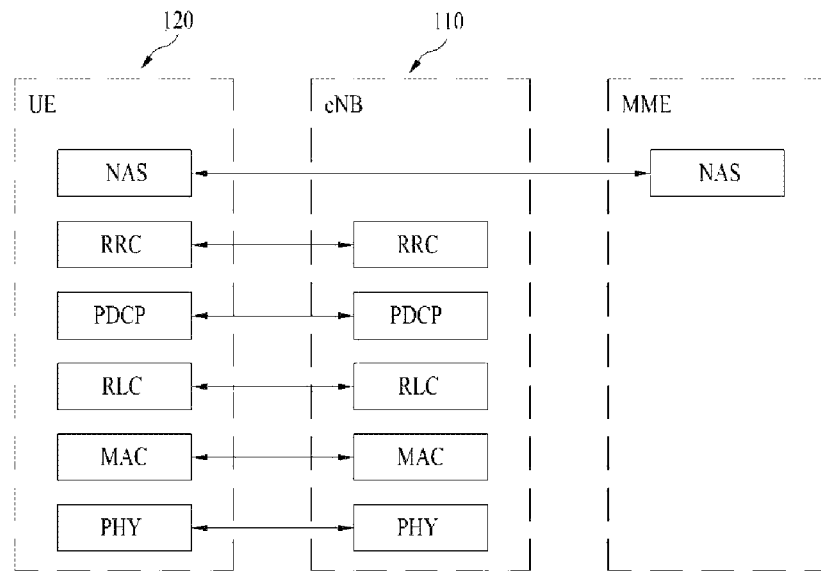
FIG. 2 is a diagram illustrating structures of a control plane and a user plane of a radio interface protocol between a user equipment and E-UTRAN based on the 3GPP radio access network standard.
Figure 2:
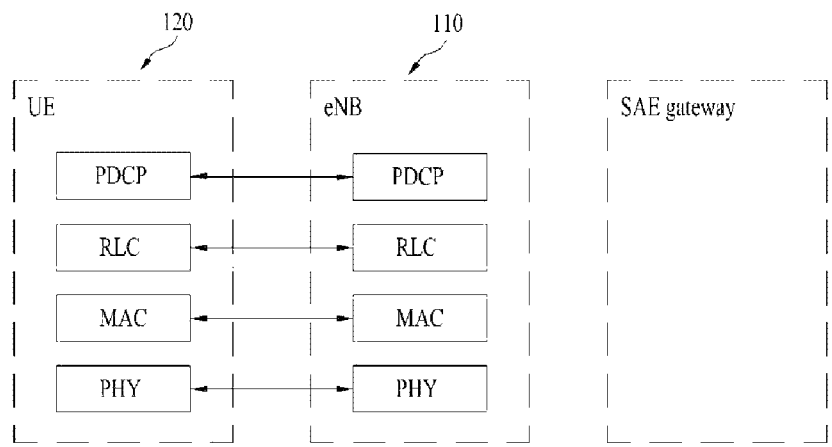

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel.

The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on the lowest part of the third layer is defined in the control plane only. The RRC layer is associated with configuration, re-configuration and release of radio bearers to be in charge of controlling the logical, transport and physical channels. In this case, the radio bearer means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station (eNB) is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
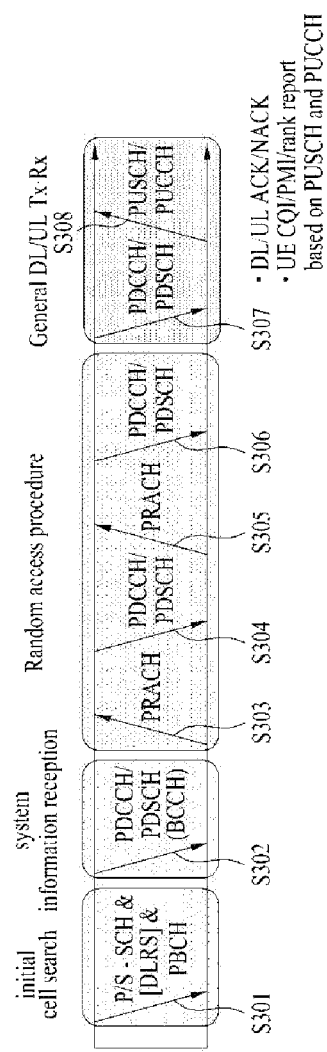
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink shared channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a physical random access channel (PRACH) (S303 and S305), and receives a response message to the preamble through the PDCCH and the PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as a general procedure of transmitting uplink/downlink signals. Control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits the aforementioned control information such as CQI/PMI/RI through the PUSCH and/or the PUCCH.

Figure 4:
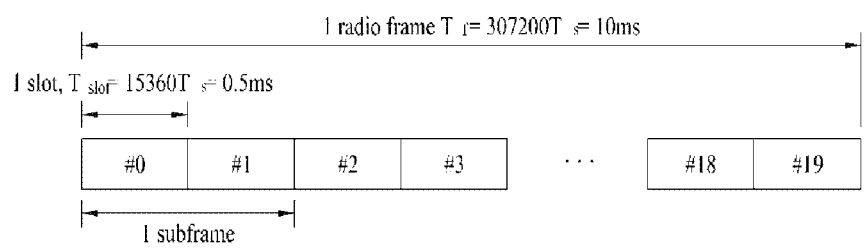
FIG. 4 is a diagram illustrating a structure of a radio frame used in an LTE system.
Figure 5:
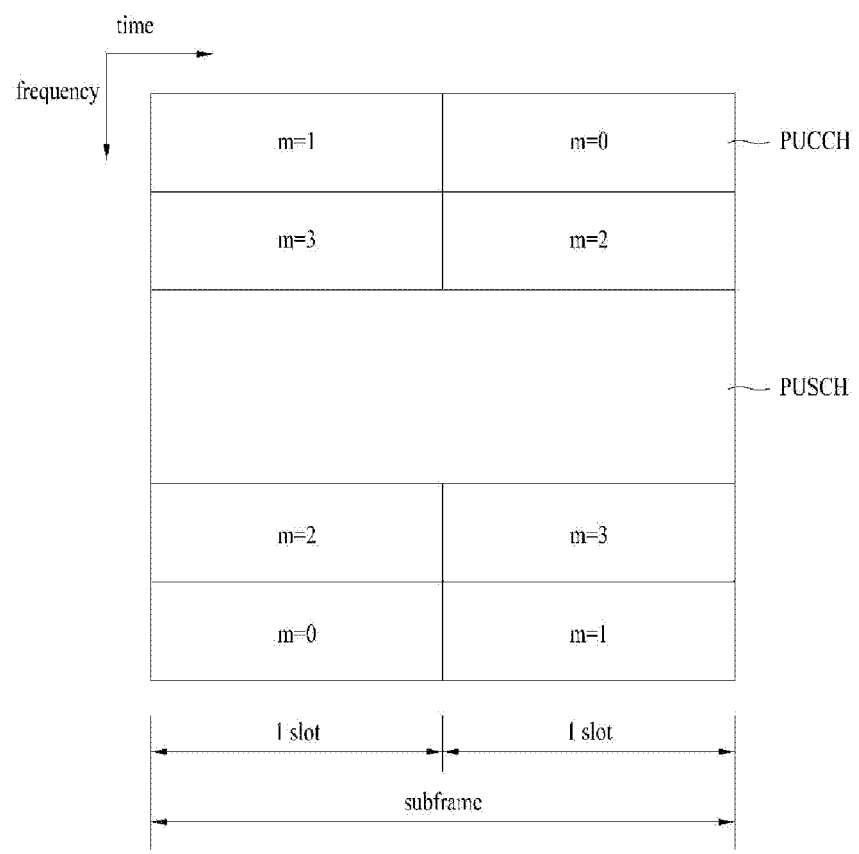
FIG. 5 is a diagram illustrating a structure of an uplink subframe used in an LTE system.

FIG. 4 is a diagram illustrating a structure of a radio frame used in an LTE system.

Referring to FIG. 4, the radio frame has a length of 10 ms (327200·Ts) and includes 10 subframes of an equal size. Each sub frame has a length of 1 ms and includes two slots. Each slot has a length of 0.5 ms (15360·Ts). In this case, Ts represents a sampling time, and is expressed by Ts=1/(15 kHz×2048)=3.2552×10−8 (about 33 ns). The slot includes a plurality of Orthogonal Frequency Division Multiplexing (OFDM) symbols or SC-FDMA symbols in a time domain, and includes a plurality of resource blocks (RBs) in a frequency domain. In the LTE system, one resource block includes twelve (12) subcarriers×seven (or six) OFDM symbols. A transmission time interval (TTI), which is a transmission unit time of data, can be determined in a unit of one or more subframes. The aforementioned structure of the radio frame is only exemplary, and various modifications can be made in the number of subframes included in the radio frame or the number of slots included in the subframe, or the number of OFDM symbols or SC-FDMA symbols included in the slot.

Figure 6:
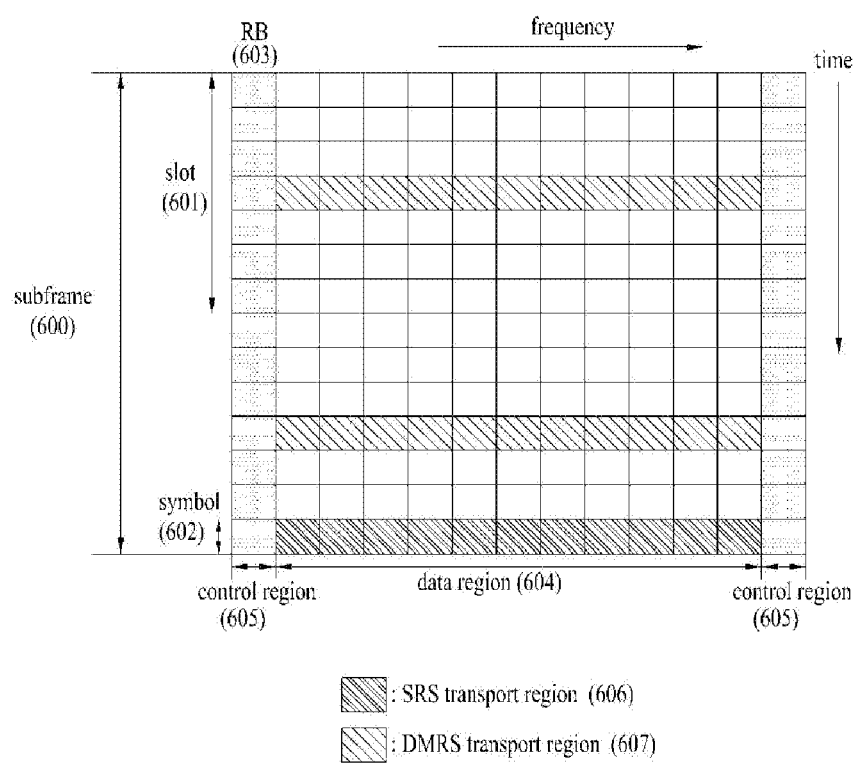
FIG. 6 is a diagram illustrating another structure of an uplink subframe used in an LTE system.

FIG. 6 is a diagram illustrating a structure of an uplink subframe used in an LTE system.

Referring to FIG. 6, a subframe 600 having a length of 1 ms, which is a basic unit of LTE uplink transmission, includes two slots 601 of 0.5 ms. In case of normal cyclic prefix (CP) length, each slot includes seven symbols 602, each of which corresponds to each SC-FDMA symbol. A resource block 603 is a resource allocation unit corresponding to twelve (12) subcarriers in a frequency domain and one slot in a time domain. A structure of an LTE uplink subframe is classified into a data region 604 and a control region 605. In this case, the data region means a series of communication resources used for transmission of data such as voice and packet transmitted to each user equipment, and corresponds to the other resources except for the control region within the subframe. The control region means a series of communication resources used for transmission of downlink channel quality report, ACK/NACK of a downlink signal, and uplink scheduling request from each user equipment.

As illustrated in FIG. 6, an interval 606 for which a sounding reference signal can be transmitted within one subframe is a duration where SC-FDMA symbol at the last location on a time axis of one subframe exists, and the sounding reference signal is transmitted through a data transmission band on a frequency axis. Sounding reference signals of several user equipments, which are transmitted to the last SC-FDMA of the same subframe, can be identified depending on the frequency location.

The sounding reference signal includes a constant amplitude zero auto correlation (CAZAC) sequence. The sounding reference signals transmitted from a plurality of user equipments are CAZAC sequences $r^{SRS}(n) = r_{u,v}^{(\alpha)}(n)$ having different cyclic shift values $\alpha$ based on the following Equation 1.

$$\alpha = 2\pi \frac{n_{SRS}^{cs}}{8}$$ [Equation 1]

In the Equation 1, $n_{SRS}^{cs}$ is a value set for each user equipment by the upper layer, and has an integer value between 0 and 7. Accordingly, the cyclic shift value may have eight values depending on $n_{SRS}^{cs}$.

The CAZAC sequences generated through cyclic shift from one CAZAC sequence are characterized in that they have a zero-correlation value with the sequences having different cyclic shift values. The sounding reference signals of the same frequency domain can be identified from one another depending on the CAZAC sequence cyclic shift value by using the above characteristic. The sounding reference signal of each user equipment is allocated on the frequency depending on a parameter set by the base station. The user equipment performs frequency hopping of the sounding reference signal to transmit the sounding reference signal to all of uplink data transmission bandwidths.

Hereinafter, a detailed method for mapping a physical resource for transmitting a sounding reference signal in an LTE system will be described.

After being multiplied by an amplitude scaling parameter $\beta_{SRS}$ to satisfy the transmission power $P_{SRS}$ of the user equipment, the sounding reference signal sequence $r^{SRS}(n)$ is mapped into a resource element (RE) having an index of (k, l) from $r^{SRS}(0)$ by the following Equation 2.

$$a_{2k+k_0,l} = \begin{cases} \beta_{SRS} r^{SRS}(k) & k = 0, 1, \cdots, M_{sc,b}^{RS} - 1 \\ 0 & \text{otherwise} \end{cases}$$ [Equation 2]

In the Equation 2, $k_0$ denotes a frequency domain start point of the sounding reference signal, and is defined by the following Equation 3.

$$k_0 = k_0' + \sum_{b=0}^{B_{SRS}} 2M_{sc,b}^{RS} n_b$$ [Equation 3]

In the Equation 3, $n_b$ denotes a frequency location index. Also, $k_0'$ for a general uplink subframe is defined by the following Equation 4, and $k_0'$ for an uplink pilot timeslot (UpPTS) is defined by the following Equation 5.

$$k_0' = (\lfloor N_{RB}^{UL}/2 \rfloor - m_{SRS,0}/2)N_{SC}^{RB} + k_{TC}$$ [Equation 4]

$$k_0' = \begin{cases} (N_{RB}^{UL} - m_{SRS,0}^{max})N_{sc}^{RB} + k_{TC} & \text{if } ((n_f \bmod 2) \times (2 - N_{SP}) + t_{RA}^1) \bmod 2 = 0 \\ k_{TC} & \text{otherwise} \end{cases}$$ [Equation 5]

In the Equation 4 and the Equation 5, $k_{TC}$ is a transmissionComb parameter signaled to the user equipment through the upper layer and has a value of 0 or 1. Also, $n_{hf}$ is 0 at the uplink pilot timeslot of the first half frame and 0 at the uplink pilot timeslot of the second half frame. $M_{sc,b}^{RS}$ is a length, i.e., bandwidth, of a sounding reference signal sequence, which is expressed in a unit of subcarrier defined as expressed by the following Equation 6.

$$M_{sc,b}^{RS} = m_{SRS,b} N_{sc}^{RB}/2$$ [Equation 6]

In the Equation 6, $m_{SRS,b}$ is a value signaled from the base station depending on an uplink bandwidth $N_{RB}^{UL}$ as illustrated in the following Table 1 to Table 4.

In order to acquire $m_{SRS,b}$, a cell specific parameter $C_{SRS}$ having an integer value between 0 and 7 and a user equipment specific parameter $B_{SRS}$ having an integer value between 0 and 3 are required. These values $C_{SRS}$ and $B_{SRS}$ are given by the upper layer.

TABLE 1

$b_{hop} = 0, 1, 2, 3,$ and $6 \leq N_{RB}^{UL} \leq 40$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop}$ = 0, 1, 2, 3, and 40 ≤ $N_{RB}^{UL}$ ≤ 60.

| SRS bandwidth configuration $C_{SRS}$ | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop}$ = 0, 1, 2, 3, and 60 ≤ $N_{RB}^{UL}$ ≤ 80.

| SRS bandwidth configuration $C_{SRS}$ | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop}$ = 0, 1, 2, 3, and 80 ≤ $N_{RB}^{UL}$ ≤ 110.

| SRS bandwidth configuration $C_{SRS}$ | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the user equipment can perform frequency hopping of the sounding reference signal to transmit the sounding reference signal to all the uplink data transmission bandwidths. The frequency hopping is set by a parameter $b_{hop}$ having a value of 0 to 3 given by the upper layer.

If frequency hopping of the sounding reference signal is not activated, i.e., in case of $b_{hop} \geq B_{SRS}$, the frequency location index $n_b$ has a constant value as expressed by the following Equation 7. In the Equation 7, $n_{RRC}$ is a parameter given by the upper layer.

$$n_b = \lfloor 4n_{RRC}/m_{SRS,b} \rfloor \bmod N_b \quad \text{[Equation 7]}$$

Meanwhile, if frequency hopping of the sounding reference signal is activated, i.e., in case of $b_{hop} < B_{SRS}$, the frequency location index $n_b$ is defined by the following Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 8]}$$

$$F_b(n_{SRS}) = \begin{cases} (N_b/2)\left\lfloor \dfrac{n_{SRS} \bmod \Pi_{b'=b_{hop}}^{b} N_{b'}}{\Pi_{b'=b_{hop}}^{b-1} N_{b'}} \right\rfloor + \left\lfloor \dfrac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases} \quad \text{[Equation 9]}$$

In the Equation 9, $n_{SRS}$ is a parameter that calculates the number of transmission times of the sounding reference signal and is defined by the following Equation 10.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, \\ \lfloor (n_f \times 10 + \lfloor n_s/12 \rfloor)/T_{SRS} \rfloor, \end{cases}$$ [Equation 10]

for 2 ms SRS periodicity of TDD frame structure otherwise

In the Equation 10, $T_{SRS}$ is a period of the sounding reference signal, and $T_{offset}$ denotes subframe offset of the sounding reference signal. Also, $n_s$ denotes a slot number, and $n_f$ denotes a frame number.

A user equipment specific sounding reference signal setup index $I_{SRS}$ for setting the period $T_{SRS}$ of the user equipment specific sounding reference signal and the subframe offset $T_{offset}$ is expressed as illustrated in the following Table 5 and Table 6 depending on FDD and TDD. In particular, Table 5 illustrates the user equipment specific sounding reference signal setup index in case of the FDD, and Table 6 illustrates the user equipment specific sounding reference signal setup index in case of the TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | Reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | Reserved | reserved |

Hereinafter, a MIMO system will be described. Multiple-Input Multiple-Output (MIMO) means a scheme that a plurality of transmitting antennas and a plurality of receiving antennas are used. Data transmission and reception efficiency can be improved by the MIMO scheme. Namely, a transmitter or receiver of a wireless communication system can enhance capacity and improve throughput by using a plurality of antennas. Hereinafter, MIMO may be referred to as 'MIMO antenna'.

The MIMO antenna technology does not depend on a signal antenna path to receive a whole message. Instead, in the MIMO antenna technology, data fragments received from a plurality of antennas are incorporated to complete data. If the MIMO antenna technology is used, a data transmission rate can be improved within a specific sized cell region, or system coverage can be enhanced with a specific data transmission rate. Also, the MIMO antenna technology can widely be used for a user equipment for mobile communication and a relay station. According to the MIMO antenna technology, it is possible to overcome limitation of a transmission rate in mobile communication according to the related art where a single antenna is used.

Figure 7:
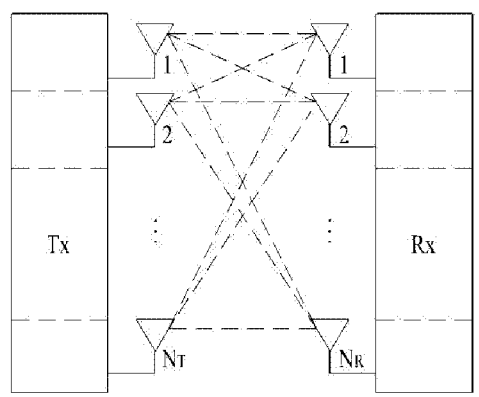
FIG. 7 is a schematic diagram illustrating a MIMO antenna communication system according to the present invention.

A schematic diagram of a MIMO communication system described in the present invention is illustrated in FIG. 7. Referring to FIG. 7, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used can be increased theoretically as expressed by the following Equation 11 as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R)$$ [Equation 11]

For example, in a MIMO communication system that uses four transmitting antennas and four receiving antennas, a transmission rate four times greater than that of a single antenna system can be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 7, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information can be expressed by a vector shown in Equation 12 as follows.

$$s = [s_1, s_2, \ldots, s_{N_T}]^T$$ [Equation 12]

Meanwhile, different kinds of transmission power can be applied to each of the transmission information $s_1, s_2, \ldots,$ $s_{N_T}$. At this time, supposing that each transmission power is $P_1, P_2, \ldots, P_{N_T}$, transmission information of which transmission power is controlled can be expressed by a vector shown in Equation 13 as follows.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T$$

Also, $\hat{S}$ can be expressed by Equation 14 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 14]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ can be expressed by Equation 15 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 15]}$$

Generally, a rank in the channel matrix may physically mean the maximum number of rows or columns that can transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 16 below.

$$\text{rank}(H) \leq \min(N_T, N_R) \quad \text{[Equation 16]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that can transmit different kinds of information. Accordingly, the channel matrix H can be expressed by the following Equation 17.

$$\text{\# of streams} \leq \text{rank}(H) \leq \min(N_T, N_R) \quad \text{[Equation 17]}$$

In this case, "# of streams" represents the number of streams. Meanwhile, it is to be understood that one stream can be transmitted through one or more antennas.

Various methods for corresponding one or more streams to several antennas can exist. These methods can be described, as follows, depending on the types of the MIMO technology. If one stream is transmitted through several antennas, it may be regarded as a spatial diversity scheme.

If several streams are transmitted through several antennas, it may be regarded as a spatial multiplexing scheme. Of course, a hybrid scheme of the spatial diversity scheme and the spatial multiplexing scheme can exist.

Since the current LTE system does not support uplink MIMO transmission, a problem occurs in that there is no method for transmitting a sounding reference signal using multiple antennas. In order to solve this problem, the present invention suggests a method for allocating a transmission-Comb parameter $k_{TC}$ and a cyclic shift value $\alpha$ of the sounding reference signal used in each antenna based on $n_{SRS}^{cs}$ (in this case, $n_{SRS}^{cs}$ has an integer value between 0 and 7) signaled through the upper layer.

First Embodiment

First of all, the first embodiment suggests that sounding reference signals used in respective antennas are set to have cyclic shift values of the maximum interval. In more detail, a cyclic shift value of each of the transmitting antennas can be set based on the following Equation 18 depending on a total of transmitting antennas.

$$n_{SRS\_k}^{cs} = \left\{ n_{SRS}^{cs} + \frac{CS_{total}}{\text{the total \# of transmit antenna}} \cdot (k-1) \right\} \quad \text{[Equation 18]}$$
$$\mod CS_{total}$$

In the Equation 18, k denotes transmitting antenna index, $n_{SRS\_k}^{cs}$ denotes a cyclic shift value allocated to the transmitting antenna of the index k, and $CS_{total}$ denotes a maximum number of cyclic shift values. In particular, the transmitting antenna index is an integer greater than 0, preferably an integer more than 1. Also, the cyclic shift values allocated from the sounding reference signals are integers between 0 and 7. Since a total of eight cyclic shift values are obtained, $CS_{total}$ has a value of 8.

Examples of the cyclic shift values allocated to the respective transmitting antennas in accordance with the Equation 18 when the number of the transmitting antennas is 2 and 4 are illustrated in Table 7 and Table 8, respectively.

TABLE 7

| $n_{SRS}^{cs}$ | Cyclic shift value for antenna port 0 | Cyclic shift value for antenna port 1 |
|---|---|---|
| 0 | 0 | 4 |
| 1 | 1 | 5 |
| 2 | 2 | 6 |
| 3 | 3 | 7 |
| 4 | 4 | 0 |
| 5 | 5 | 1 |
| 6 | 6 | 2 |
| 7 | 7 | 3 |

TABLE 8

| $n_{SRS}^{cs}$ | Cyclic shift value for antenna port 0 | Cyclic shift value for antenna port 1 | Cyclic shift value for antenna port 2 | Cyclic shift value for antenna port 3 |
|---|---|---|---|---|
| 0 | 0 | 2 | 4 | 6 |
| 1 | 1 | 3 | 5 | 7 |
| 2 | 2 | 4 | 6 | 0 |
| 3 | 3 | 5 | 7 | 1 |
| 4 | 4 | 6 | 0 | 2 |

TABLE 8-continued

| $n_{SRS}^{cs}$ | Cyclic shift value for antenna port 0 | Cyclic shift value for antenna port 1 | Cyclic shift value for antenna port 2 | Cyclic shift value for antenna port 3 |
|---|---|---|---|---|
| 5 | 5 | 7 | 1 | 3 |
| 6 | 6 | 0 | 2 | 4 |
| 7 | 7 | 1 | 3 | 5 |

Next, the present invention suggests that the transmissionComb parameter and the cyclic shift value allocated to each antenna are set based on one value of $n_{SRS}^{cs}$ and one value of $k_{TC}$ signaled from the upper layer. Also, the present invention suggests that different transmissionComb parameters or the same transmission Comb parameter $k_{TC}$ is allocated to each antenna for transmitting a sounding reference signal if the sounding reference signal is transmitted to four transmitting antennas considering that orthogonality between the sounding reference signals transmitted to different antennas may be destroyed due to increase of delay spread. In other words, a code division multiplexing scheme having different cyclic shift values between the respective antennas is applied to specific values $n_{SRS}^{cs}$ based on initial cyclic shift values $n_{SRS}^{cs}$ (in this case, $n_{SRS}^{cs}$ has integer values between 0 and 7) signaled through the upper layer, whereby the same transmissionComb parameter $k_{TC}$ is allocated to each antenna. In order to prevent orthogonality, which may occur between the respective antennas due to increase of delay spread during sounding reference signal transmission, from being destroyed, a code division multiplexing scheme and a frequency division multiplexing scheme are simultaneously applied to another specific values $n_{SRS}^{cs}$, wherein the code division multiplexing scheme allocates different transmissionComb parameters to the respective antennas to allow each antenna to have its respective cyclic shift value different from those of the other antennas, and the frequency multiplexing scheme is based on different transmissionComb parameters. In this case, allocation of a separate transmissionComb parameter to each antenna is applied to the case where the sounding reference signal is transmitted to four antennas. However, allocation of a separate transmissionComb parameter to each antenna is not applied to the case where the sounding reference signal is transmitted to two antennas as the problem of orthogonality destruction little occurs.

In more detail, the transmissionComb parameter $k_{TC}$ signaled from the upper layer is set to the initial value, and based on the transmissionComb parameter $k_{TC}$ signaled from the upper layer, the same transmissionComb parameter is allocated to each antenna or a separate transmissionComb parameter is allocated to each antenna. The following Table 9 Table 12 illustrate the cyclic shift values and transmissionComb parameters according to the first embodiment of the present invention, which are allocated to each antenna depending on the value of $n_{SRS}^{cs}$ in uplink transmission based on four transmitting antennas. In Table 9 to Table 12, the initial value of $k_{TC}$ is expressed as A. Preferably, the initial value A has a value of 1 or 0.

TABLE 9

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 2 | 4 | 6 | A | A | A | A |
| 1 | 1 | 3 | 5 | 7 | A | A | A | A |
| 2 | 2 | 4 | 6 | 0 | A | A | A | A |
| 3 | 3 | 5 | 7 | 1 | A | A | A | A |
| 4 | 4 | 6 | 0 | 2 | 1-A | A | 1-A | A |
| 5 | 5 | 7 | 1 | 3 | 1-A | A | 1-A | A |
| 6 | 6 | 0 | 2 | 4 | 1-A | A | 1-A | A |
| 7 | 7 | 1 | 3 | 5 | 1-A | A | 1-A | A |

TABLE 10

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 2 | 4 | 6 | A | A | A | A |
| 1 | 1 | 3 | 5 | 7 | A | A | A | A |
| 2 | 2 | 4 | 6 | 0 | A | A | A | A |
| 3 | 3 | 5 | 7 | 1 | A | A | A | A |
| 4 | 4 | 6 | 0 | 2 | A | A | 1-A | 1-A |
| 5 | 5 | 7 | 1 | 3 | A | A | 1-A | 1-A |
| 6 | 6 | 0 | 2 | 4 | A | A | 1-A | 1-A |
| 7 | 7 | 1 | 3 | 5 | A | A | 1-A | 1-A |

TABLE 11

| $n_{SRS}^{cs}$ | CS value | | | | Transmission comb value | | | |
|---|---|---|---|---|---|---|---|---|
| | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 2 | 4 | 6 | A | A | A | A |
| 1 | 1 | 3 | 5 | 7 | A | A | A | A |
| 2 | 2 | 4 | 6 | 0 | A | A | A | A |
| 3 | 3 | 5 | 7 | 1 | A | A | A | A |
| 4 | 4 | 6 | 0 | 2 | 1-A | 1-A | A | A |
| 5 | 5 | 7 | 1 | 3 | 1-A | 1-A | A | A |
| 6 | 6 | 0 | 2 | 4 | 1-A | 1-A | A | A |
| 7 | 7 | 1 | 3 | 5 | 1-A | 1-A | A | A |

TABLE 12

| $n_{SRS}^{cs}$ | CS value | | | | Transmission comb value | | | |
|---|---|---|---|---|---|---|---|---|
| | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 2 | 4 | 6 | A | A | A | A |
| 1 | 1 | 3 | 5 | 7 | A | A | A | A |
| 2 | 2 | 4 | 6 | 0 | A | A | A | A |
| 3 | 3 | 5 | 7 | 1 | A | A | A | A |
| 4 | 4 | 6 | 0 | 2 | A | 1-A | A | 1-A |
| 5 | 5 | 7 | 1 | 3 | A | 1-A | A | 1-A |
| 6 | 6 | 0 | 2 | 4 | A | 1-A | A | 1-A |
| 7 | 7 | 1 | 3 | 5 | A | 1-A | A | 1-A |

Second Embodiment

The second embodiment of the present invention suggests that a cyclic shift value of a maximum distance is allocated to an antenna port 0 and an antenna port 1 in pairs regardless of uplink transmission rank, and a cyclic shift value corresponding to an intermediate value of the cyclic shift value allocated to the antenna port 0 and the antenna port 1 is allocated to an antenna port 2 and an antenna port 3 in pairs. Examples of the cyclic shift values allocated to the respective antenna ports in accordance with the second embodiment are illustrated in Table 13 below.

TABLE 13

| $n_{SRS}^{cs}$ | Cyclic shift value for antenna port 0 | Cyclic shift value for antenna port 1 | Cyclic shift value for antenna port 2 | Cyclic shift value for antenna port 3 |
|---|---|---|---|---|
| 0 | 0 | 4 | 2 | 6 |
| 1 | 1 | 5 | 3 | 7 |
| 2 | 2 | 6 | 0 | 4 |
| 3 | 3 | 7 | 1 | 5 |
| 4 | 4 | 2 | 6 | 0 |

TABLE 13-continued

| $n_{SRS}^{cs}$ | Cyclic shift value for antenna port 0 | Cyclic shift value for antenna port 1 | Cyclic shift value for antenna port 2 | Cyclic shift value for antenna port 3 |
|---|---|---|---|---|
| 5 | 5 | 1 | 7 | 3 |
| 6 | 6 | 0 | 4 | 2 |
| 7 | 7 | 3 | 5 | 1 |

Also, considering that orthogonality between the sounding reference signals transmitted to different antennas may be destroyed due to increase of delay spread based on the cyclic shift value suggested in the second embodiment, the cyclic shift value and the transmissionComb parameter allocated to each antenna are set based on one value of $n_{SRS}^{cs}$ and $k_{TC}$ as illustrated in Table 14 to Table 17 below. In particular, the following Table 14 Table 17 illustrate the cyclic shift values and transmissionComb parameters according to the second embodiment of the present invention, which are allocated to each antenna depending on the value of $n_{SRS}^{cs}$ in uplink transmission based on four transmitting antennas. In Table 14 to Table 17, the initial value of $k_{TC}$ is expressed as A. Preferably, the initial value A has a value of 1 or 0.

TABLE 14

| $n_{SRS}^{cs}$ | CS value | | | | Transmission comb value | | | |
|---|---|---|---|---|---|---|---|---|
| | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 4 | 2 | 6 | A | A | A | A |
| 1 | 1 | 5 | 3 | 7 | A | A | A | A |
| 2 | 2 | 6 | 0 | 4 | A | A | A | A |
| 3 | 3 | 7 | 1 | 5 | A | A | A | A |
| 4 | 4 | 0 | 6 | 2 | 1-A | A | 1-A | A |
| 5 | 5 | 1 | 7 | 3 | 1-A | A | 1-A | A |

TABLE 14-continued

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 6 | 6 | 2 | 4 | 0 | 1-A | A | 1-A | A |
| 7 | 7 | 3 | 5 | 1 | 1-A | A | 1-A | A |

TABLE 15

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 4 | 2 | 6 | A | A | A | A |
| 1 | 1 | 5 | 3 | 7 | A | A | A | A |
| 2 | 2 | 6 | 0 | 4 | A | A | A | A |
| 3 | 3 | 7 | 1 | 5 | A | A | A | A |
| 4 | 4 | 0 | 6 | 2 | A | A | 1-A | 1-A |
| 5 | 5 | 1 | 7 | 3 | A | A | 1-A | 1-A |
| 6 | 6 | 2 | 4 | 0 | A | A | 1-A | 1-A |
| 7 | 7 | 3 | 5 | 1 | A | A | 1-A | 1-A |

TABLE 16

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 4 | 2 | 6 | A | A | A | A |
| 1 | 1 | 5 | 3 | 7 | A | A | A | A |
| 2 | 2 | 6 | 0 | 4 | A | A | A | A |
| 3 | 3 | 7 | 1 | 5 | A | A | A | A |
| 4 | 4 | 0 | 6 | 2 | 1-A | 1-A | A | A |
| 5 | 5 | 1 | 7 | 3 | 1-A | 1-A | A | A |
| 6 | 6 | 2 | 4 | 0 | 1-A | 1-A | A | A |
| 7 | 7 | 3 | 5 | 1 | 1-A | 1-A | A | A |

TABLE 17

| | CS value | | | | Transmission comb value | | | |
|---|---|---|---|---|---|---|---|---|
| $n_{SRS}^{cs}$ | Antenna port = 0 | Antenna port = 1 | Antenna port = 2 | Antenna port = 3 | Antenna port = 0 | Antenna port = 1 | Antenna port = 2 | Antenna port = 3 |
| 0 | 0 | 4 | 2 | 6 | A | A | A | A |
| 1 | 1 | 5 | 3 | 7 | A | A | A | A |
| 2 | 2 | 6 | 0 | 4 | A | A | A | A |
| 3 | 3 | 7 | 1 | 5 | A | A | A | A |
| 4 | 4 | 2 | 6 | 0 | A | 1-A | A | 1-A |
| 5 | 5 | 1 | 7 | 3 | A | 1-A | A | 1-A |
| 6 | 6 | 0 | 4 | 2 | A | 1-A | A | 1-A |
| 7 | 7 | 3 | 5 | 1 | A | 1-A | A | 1-A |

Referring to Table 9 to Table 12 and Table 14 to Table 17, if the same transmissionComb parameter is used, since each sounding reference signal is identified depending on the cyclic shift value, it is noted that the code division multiplexing scheme is used. Also, if different transmissionComb parameters are used, it is noted that the code division multiplexing scheme and the frequency division multiplexing scheme are used at the same time.

In particular, Table 12 and Table 17 can be expressed by the following Equation 19.

$$k_{TC}^{(\tilde{p})} = \begin{cases} 1 - \overline{k}_{TC} & \text{if } n_{SRS}^{cs} \in \{4, 5, 6, 7\} \text{ and } \tilde{p} \in \{1, 3\} \\ \overline{k}_{TC} & \text{otherwise} \end{cases} \quad \text{[Equation 19]}$$

In the Equation 19, $k_{TC}^{(\tilde{p})}$ denotes a transmissionComb parameter allocated to an antenna port $\tilde{p}$, and $\overline{k}_{TC}$ means the transmissionComb parameter $k_{TC}$ conventionally signaled from the upper layer. In particular, it is noted from the Equation 19 in the same manner as Table 12 and Table 17 that a transmissionComb parameter $1-\overline{k}_{TC}$ not the transmissionComb parameter $\overline{k}_{TC}$ is allocated to the antenna ports 1 and 3 if the value of $n_{SRS}^{cs}$ is 4 to 7.

According to the present invention, reference signal multiplexing for supporting a MIMO antenna scheme in a wireless communication system can be performed, and more excellent channel estimation throughput can be obtained.

The present invention can be used for the method for transmitting a sounding reference signal periodically using multiple antennas in a wireless communication system and the method for transmitting a sounding reference signal non-periodically using multiple antennas in a wireless communication system. Additionally, although the present invention has been described that the values of $n_{SRS}^{cs}$ and $k_{TC}$ are allocated from the upper layer, the principle of the present invention can be applied to the case where the values of $n_{SRS}^{cs}$ and $k_{TC}$ are dynamically varied through the PDCCH. Also, although the present invention has been described that the initial cyclic shift value of $n_{SRS}^{cs}$ is independently allocated for the sounding reference signal from the upper layer, a method for setting $n_{SRS}^{cs}$ by reusing a cyclic shift value used for DMRS included in a DCI format 0 and a DCI format 4 can also be applied to the present invention.

Figure 8:
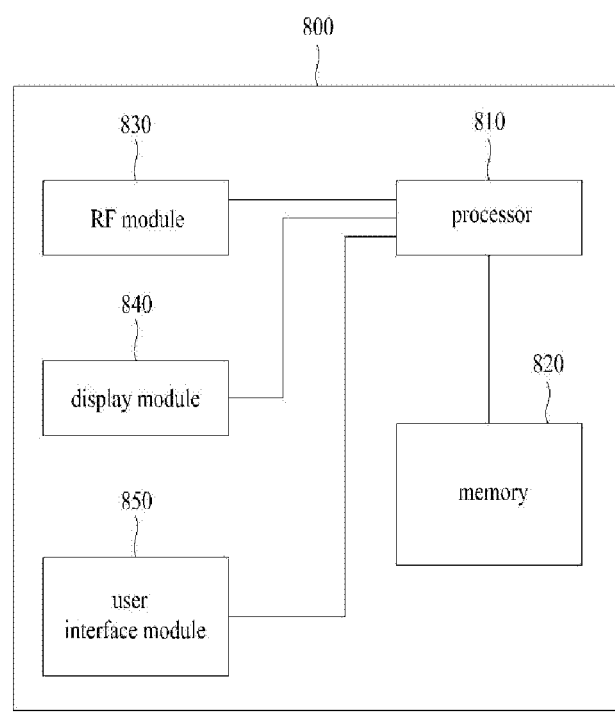
FIG. 8 is a block diagram illustrating a communication transceiver according to the embodiment of the present invention.

FIG. 8 is a block diagram illustrating a communication transceiver according to the embodiment of the present invention. The transceiver may be a part of the base station and the user equipment.

Referring to FIG. 8, the transceiver 800 includes a processor 810, a memory 820, a radio frequency (RF) module 830, a display module 840, and a user interface module 850.

The transceiver 800 is illustrated for convenience of description, and some of its modules may be omitted. Also, the transceiver 800 may further include necessary modules. Moreover, some modules of the transceiver 800 may be divided into segmented modules. The processor 810 is configured to perform the operation according to the embodiment of the present invention illustrated with reference to the drawings.

In more detail, if the transceiver 800 is a part of the base station, the processor 810 can generate a control signal and map the control signal into a control channel configured within a plurality of frequency blocks. Also, if the transceiver 800 is a part of the user equipment, the processor 810 can identify a control channel allocated thereto, through the signal received from the plurality of frequency blocks, and can extract a control signal from the control channel.

Afterwards, the processor 810 can perform the necessary operation based on the control signal. For the detailed operation of the processor 810, refer to the description illustrated in FIG. 1 to FIG. 7.

The memory 820 is connected with the processor 810 and stores an operating system, an application, a program code, and data therein. The RF module 830 is connected with the processor 810 and converts a baseband signal to a radio signal or vice versa. To this end, the RF module 830 performs analog conversion, amplification, filtering and frequency uplink conversion, or their reverse processes. The display module 840 is connected with the processor 810 and displays various kinds of information. Examples of the display module 840 include, but not limited to, a liquid crystal display (LCD), a light emitting diode (LED), and an organic light emitting diode (OLED). The user interface module 850 is connected with the processor 810, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the user equipment and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as a mobile station (MS) and a mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The present invention can be applied to a wireless communication system. In more detail, the present invention can be applied to the method and apparatus for transmitting a sounding reference signal from a user equipment in a wireless communication system that supports MIMO antenna transmission.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting sounding reference signals via multiple antenna ports by a user equipment (UE) in a wireless communication system, the method comprising:
   receiving a parameter for calculating cyclic shift values via a higher layer;
   applying a code division multiplexing (CDM) scheme to the sounding reference signals corresponding to the multiple antenna ports using the parameter;
   applying a frequency division multiplexing (FDM) scheme to the sounding reference signals corresponding to the multiple antenna ports when the parameter has a first value; and
   transmitting the sounding reference signals on a last symbol of a subframe via the multiple antenna ports.

2. The method of claim 1, wherein, when the parameter has a second value, the FDM scheme is not applied to the sounding reference signals.

3. The method of claim 2, wherein the first value is one of integers between 4 and 7, and the second value is one of integers between 0 and 3.

4. The method of claim 1, wherein the applying the CDM scheme to the sounding reference signals corresponding to the multiple antenna ports using the parameter comprises:
   calculating the cyclic shift values using the parameter; and
   generating the sounding reference signals using corresponding to the multiple antenna ports the cyclic shift values.

5. A user equipment (UE) in a wireless communication system, the UE comprising:
   a processor configured to:
      configure a parameter for calculating cyclic shift values via a higher layer,
      apply a code division multiplexing (CDM) scheme to sounding reference signals corresponding to multiple antenna ports using the parameter, and
      apply a frequency division multiplexing (FDM) scheme to the sounding reference signals corresponding to the multiple antenna ports when the parameter has a first value; and
   an RF (Radio Frequency) transceiver configured to transmit the sounding reference signals on a last symbol of a subframe via the multiple antenna ports.

6. The UE of claim 5, wherein, when the parameter has a second value, the FDM scheme is not applied to the sounding reference signals.

7. The UE of claim 5, wherein the first value is one of integers between 4 and 7, and the second value is one of integers between 0 and 3.

8. The UE of claim 5, wherein:
   the cyclic shift values are calculated using the parameter, and
   the sounding reference signals corresponding to the multiple antenna ports are generated by using the cyclic shift values.

* * * * *